(12) United States Patent
Restrepo

(10) Patent No.: US 8,963,434 B2
(45) Date of Patent: Feb. 24, 2015

(54) ELECTRICAL SWITCH DEVICE WITH AUTOMATIC DIMMING CONTROL

(75) Inventor: Carlos Eduardo Restrepo, Atlanta, GA (US)

(73) Assignee: Cooper Technologies Company, Houston, TX (US)

( * ) Notice: Subject to any disclaimer, the term of this patent is extended or adjusted under 35 U.S.C. 154(b) by 215 days.

(21) Appl. No.: 13/616,866

(22) Filed: Sep. 14, 2012

(65) Prior Publication Data

US 2014/0077707 A1    Mar. 20, 2014

(51) Int. Cl.
*H05B 37/02* (2006.01)

(52) U.S. Cl.
USPC ............................. 315/158; 315/224; 315/307

(58) Field of Classification Search
USPC .................. 315/158, 159, 224, 297, 307, 308
See application file for complete search history.

(56) References Cited

U.S. PATENT DOCUMENTS

| | | | |
|---|---|---|---|
| 4,368,406 A | 1/1983 | Kruzich et al. | |
| 5,789,869 A | 8/1998 | Lo et al. | |
| 6,858,995 B2 | 2/2005 | Lee et al. | |
| 7,318,648 B2 | 1/2008 | Gilbert et al. | |
| 7,663,325 B2 | 2/2010 | McDonough et al. | |
| 7,741,785 B2 | 6/2010 | Juen et al. | |
| 8,040,078 B1 | 10/2011 | Knoble et al. | |
| 8,111,010 B2 | 2/2012 | Zimmermann et al. | |
| 8,193,732 B2 | 6/2012 | Ayala et al. | |
| 2010/0207532 A1* | 8/2010 | Mans ............................. | 315/158 |
| 2012/0049749 A1 | 3/2012 | Pearlman et al. | |
| 2014/0062340 A1* | 3/2014 | Elgayyar ....................... | 315/360 |

* cited by examiner

*Primary Examiner* — Daniel D Chang
(74) *Attorney, Agent, or Firm* — King & Spalding LLP

(57) ABSTRACT

The electrical switch device can includes a method and dimmer determination device that automatically determining a dimmer level for an electronic device. A signal is received and, when coupled with the time of day and the ambient light level, an appropriate algorithm can be selected. The output of the algorithm provides the dimmer level, which is sent to a controller for output to the electrical device. Based on user feedback, the algorithms and thresholds used to determine the dimmer level can be adjusted, created, and deleted to provide a more accurate dimming level in the future.

20 Claims, 6 Drawing Sheets ative switch device with automatic dimming control in

ELECTRICAL SWITCH DEVICE WITH AUTOMATIC DIMMING CONTROL

TECHNICAL FIELD

The present disclosure relates generally to a light control device, and more particularly to a dimmer determination device used to automatically control lighting, fan, and/or other electrical functions that can have variable outputs.

BACKGROUND

When a dimmer switch is connected to an electrical device (often a light source), the output of the electrical device can be changed by changing the setting of the dimmer switch. Oftentimes, a desired output of the electrical device (and thus a corresponding setting of the dimming switch controlling the electrical device) varies based on one or more of a number of factors, including but not limited to the time of day and the amount of ambient light in the room or space in which the electrical device is located.

When the dimmer switch is turned on, the electrical device receives an amount of power that corresponds to the setting of the dimmer switch. At times, the setting of the dimmer switch is adjusted by a user after the user turns on the dimmer switch because the output of the electrical device is not at a desired level. For example, when a light source is turned off the previous evening after the sun has set, the setting of the dimmer switch may have been high so that the light source gave off more light. When the light source is turned on the following day after the sun has risen, the setting of the dimmer switch may have to be lowered because the amount of light given off by the light source the previous evening is more than what a user desires.

SUMMARY

In general, in one aspect, the disclosure relates to a method for determining a dimmer level for an electrical device. The method can include receiving an activation signal, and determining, in response to receiving the activation signal, a time of day and an ambient light level. The method can further include generating, based on the time of day and the ambient light level and using a hardware processor, a first dimmer level. The method can also include sending, to a controller, the first dimmer level, where the controller sends an amount of power to the electrical device based on the first dimmer level.

In another aspect, the disclosure can generally relate to a dimmer determination device. The dimmer determination device can include a storage repository that stores a number of events. The dimmer determination device can also include memory positioned within the cavity, where the memory stores a number of instructions. The dimmer determination device can further include an ambient light sensor, and a timer that tracks time. The dimmer determination device can also include a hardware processor for executing the instructions stored in the memory. The dimmer determination device can further include a dimmer determination engine operatively coupled to the hardware processor, the storage repository, the memory, the ambient light sensor, and the timer, where the dimmer determination engine sends a number of dimming signals, generated using the events, to a dimming controller.

In yet another aspect, the disclosure can generally relate to an electrical switch device. The electrical switch device can include a housing having a number of walls forming a cavity. The electrical switch device can also include a dimmer switch disposed on one of the walls and operatively coupled to an electrical device. The electrical switch device can further include a controller operatively coupled to the dimmer switch and positioned inside the cavity. The electrical switch device can also include a dimmer determination device operatively coupled to the controller and positioned inside the cavity. The dimmer determination device of the electrical switch device can include a storage repository that stores a number of events, and memory positioned within the cavity, where the memory stores a number of instructions. The dimmer determination device can also include an ambient light sensor, and a timer that tracks time. The dimmer determination device can further include a hardware processor for executing the instructions stored in the memory. The dimmer determination device can also include a dimmer determination engine operatively coupled to the hardware processor, the storage repository, the memory, the ambient light sensor, and the timer, where the dimmer determination engine sends a number of dimming signals, generated using the events, to the controller, where the controller uses the dimming signals to determine an amount of power to send to the electrical device.

In still another aspect, the disclosure can generally relate to a computer readable medium that includes computer readable program code embodied therein for performing a method for controlling an electrical device. The method can include receiving an activation signal, and determining, in response to receiving the activation signal, a time of day and an ambient light level. The method can also include generating, based on the time of day and the ambient light level, a dimmer level. The method can further include sending, to a control device, the dimmer level, where the control device sends an amount of power to the electrical device based on the dimmer level.

These and other aspects, objects, features, and embodiments will be apparent from the following description and the appended claims.

BRIEF DESCRIPTION OF THE DRAWINGS

The drawings illustrate only exemplary embodiments of an electrical switch device with automatic dimming control and are therefore not to be considered limiting of its scope, as the electrical switch device with automatic dimming control can admit to other equally effective embodiments. The elements and features shown in the drawings are not necessarily to scale, emphasis instead being placed upon clearly illustrating the principles of the exemplary embodiments. Additionally, certain dimensions or positionings may be exaggerated to help visually convey such principles. In the drawings, reference numerals designate like or corresponding, but not necessarily identical, elements.

DETAILED DESCRIPTION OF EXEMPLARY EMBODIMENTS

Figure 1:
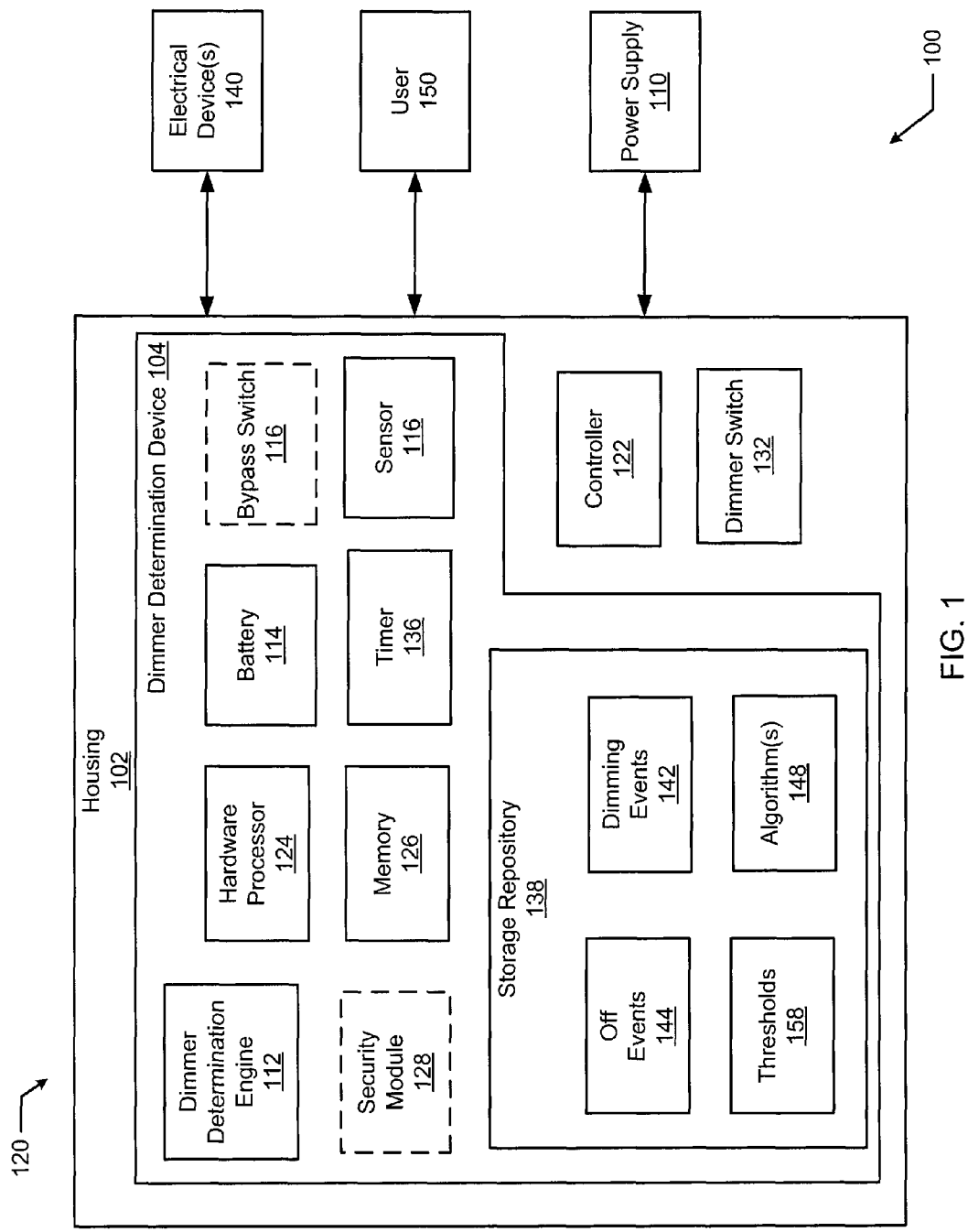
FIG. 1 shows a diagram of an exemplary system for use in incorporating the electrical switch device with automatic dimming control in accordance with one or more exemplary embodiments.

Exemplary embodiments of an automatic switch device with automatic dimming control (also simply called a "device" and/or an "electrical switch device" herein) will now be described in detail with reference to the accompanying figures. Like elements in the various figures are denoted by like reference numerals for consistency. In the following detailed description of the exemplary embodiments, numerous specific details are set forth in order to provide a more thorough understanding of the disclosure herein. However, it will be apparent to one of ordinary skill in the art that the exemplary embodiments herein may be practiced without these specific details. In other instances, well-known features have not been described in detail to avoid unnecessarily complicating the description.

The electrical switch device with automatic dimming control described herein can include one or more of a number of different types of electric switching devices that control an amount of power delivered to an electrical device in addition to full on and full off. For example, an electrical switch device with automatic dimming control can be a light dimmer, a fan control switch, a thermostat (e.g., for adjusting the output of a heating unit and/or an air conditioning unit), some other suitable device, or any combination thereof. An electrical switch device can be in-wall (i.e., mounted in an aperture in a surface, such as a wall or a ceiling), stand-alone, or be used in any other type of setting.

If the electrical switch device is used in an in-wall application, then the electrical switch device described herein can, at least in part, be mechanically coupled to a wall by being mounted within and/or behind the wall. As defined herein, a wall is any type of building material (e.g., drywall, ceiling tiles, brick, plywood, wall studs, cement, cinder blocks) that is used to create a surface (e.g., wall, ceiling, floor) that defines a structure or a space (e.g., room, duct) within a structure. A wall can also include some other object (e.g., a mounting plate, a junction box) adjacent to building material. The surface can be located within the structure or outside the structure. The surface can be in an open area or in an enclosed area.

In one or more exemplary embodiments, an electrical switch device is used with a single gang junction box. In such a case, exemplary embodiments of an electrical switch device typically meet the standards of a National Electrical Manufacturer's Association (NEMA) 1 enclosure. Alternatively, exemplary electrical switch device described herein can also be used with multiple (e.g., two, three, four) gang junction boxes. In such a case, exemplary embodiments of an electrical switch device typically meet the standards set by NEMA, and/or any other appropriate standard-setting entity, for such an enclosure.

References made herein to a dimmer level refers to an amount of power (e.g., voltage, current) delivered to an electrical device. In certain exemplary embodiments, the dimmer level is expressed in terms that are relative to the full amount of power that can be delivered to an electrical device. For example, a dimmer level can be zero (designating that no power is delivered to the electrical device), one (designating that the full amount of power that can be received by the electrical device is delivered to the electrical device), or any number in between 0 and 1 (for a proportionate amount of power delivered to the electrical device). The dimmer level can be expressed in one or more of a number of ways, including but not limited to a percentage (e.g., 50%), a fraction (e.g., ⅓), and a decimal number (e.g., 0.25).

FIG. 1 shows a diagram of a system 100 for use with an electrical switch device with automatic dimming control in accordance with one or more exemplary embodiments. Referring now to FIG. 1, the exemplary system 100 includes a power supply 110, an electrical switch device 120, one or more electrical devices 140, and a user 150. In one exemplary embodiment, the electrical switch device 120 includes a housing 102 that houses (or has disposed thereupon) a dimmer determination device 104, a controller 122, and a dimmer switch 132. The dimmer determination device 104 includes a dimmer determination engine 112, a hardware processor 124, memory 126, a timer 136, a storage repository 138 (which stores, at least, dimming events 142, off events 144, algorithms 148, and thresholds 158), a sensor 112, a battery 114, and, optionally, a bypass switch 116, and a security module 128. Each of these components is described below. Exemplary embodiments are not limited to the configuration shown in FIG. 1 and discussed herein.

Referring to FIG. 1, the exemplary power supply 110 is one or more sources of energy (e.g., electricity) used to provide power and/or control to the electrical switch device 120 and, at times, the one or more electrical devices 140 through the electrical switch device 120. The power supply 110 typically provides electricity that is in alternating current (AC) format and/or direct current (DC) format. The power supply 110 can be physically separate from the electrical switch device 120 (as with 120 VAC household wiring that is connected to the electrical switch device 120) and/or internal within the electrical switch device 120 (as with the battery 114).

The amount of voltage delivered by the power supply 110 to the electrical switch device 120 can be any amount suitable to operate the elements of the electrical switch device 120. In certain exemplary embodiments, the voltage delivered by the power supply 110 is transformed, rectified, inverted, and/or otherwise manipulated, at the power supply 110 and/or within the electrical switch device 120, so that the various components of the electrical switch device 120 receive a proper voltage and/or current level to operate properly.

In one or more exemplary embodiments, the electrical switch device 120 controls one or more electrical devices 140. For example, the electrical switch device 120 receives an interaction (e.g., a manual manipulation of the dimmer switch 132) from the user 150 and, in response, generates and sends one or more instructions based on the interaction received from the user 150. In addition, or in the alternative, the electrical switch device 120 can receive information from one or more electrical devices 140, the dimmer determination device 104, and/or the controller 122 (or portions thereof). In response in such a case, the electrical switch device 120 generates and sends one or more instructions based on the interaction received from the one or more electrical devices 140, the dimmer determination device 104, and/or the controller 122.

One or more of a number of components (e.g., the controller 122, the hardware processor 124, the memory 126, the dimmer switch 132, the storage repository 138) of the electrical switch device 120 are used to perform the various functions of the electrical switch device 120. Such components can be discrete components, part of a semiconductor, and/or part of a software-based control circuit.

In one or more exemplary embodiments, the electrical switch device 120 (or, more specifically, the controller 122 and/or the dimmer determination device 104) is implemented according to a client-server topology. The electrical switch device 120 can correspond to enterprise software running on one or more servers, and in some embodiments can be implemented as a peer-to-peer system, or resident upon a single computing system. In additional exemplary embodiments, the electrical switch device 120 is accessible from other machines using one or more application programming interfaces and/or user interfaces (not shown). In one or more exemplary embodiments, the electrical switch device 120 is accessible over a network connection (not shown), such as the Internet, by one or more users (e.g., user, data source, image capture device). Further, information and/or instructions received and/or generated by the electrical switch device 120 can also be stored and accessed over the network connection.

Alternatively or additionally, in one or more exemplary embodiments, the electrical switch device 120 is a local computer system of the user 150. In such embodiments, the electrical switch device 120 can, optionally, not be implemented using a client-server topology. For example, the electrical switch device 120 can correspond to a portable computer, mobile device, another type of computing device, and/or combination of multiple computing devices. Additionally or alternatively, the electrical switch device 120 can be a distributed computer system and/or multi-processor computer system that includes multiple distinct computing devices.

In certain exemplary embodiments, the electrical switch device 120 is coupled to an outlet box, as can be used, for example, by a wall-mounted light switch. The electrical switch device 120 can be wireless, detachable, and/or portable. In exemplary embodiments, the electrical switch device 120 operates as a remote control device. In such a case, the device 120 includes one or more components (e.g., transceiver) configured to allow signals to be sent and/or received wirelessly. Further, in such a case, the electrical switch device 120 can be made of two or more components that are detachable (removable) from/attachable to each other.

The detachable components of the electrical switch device 120 can detach/attach using one or more of a number of fastening mechanisms, including but not limited to a spring catch and release, a snap, a slotted receiver, mating threads, and a clamp. When a portion of the electrical switch device 120 is detached, the detached components can communicate with each other as long as such components remain within a certain distance of each other. Such a distance can depend on one or more of a number of factors, including but not limited to the wireless technology being used.

In certain exemplary embodiments, the electrical switch device 120 includes a housing 102, on and/or inside of which one or more components (e.g., controller 122, hardware processor 124, timer 136) of the electrical switch device 120 are located. Alternatively, one or more components of the electrical switch device 120 can be located outside of the housing 102 but operatively coupled (using wired and/or wireless technology) to one or more other components of the electrical switch device 120 that are located inside of the housing 102. For example, the dimmer determination device 104 can be remotely located outside the housing 102 but operatively coupled to the housing 102 and/or its components. The housing 102 can be made of one or more of a number of suitable materials, including but not limited to plastic, metal, glass, nylon, and rubber.

The housing 102 can include one or more of a number of components, including but not limited to a wall plate and a mounting strap. The housing 102 and its components are discussed below in more detail with respect to FIGS. 2A and 2B. The components positioned inside of or on a surface of the housing 102 can vary based on one or more of a number of factors, including but not limited to the size of the housing 102 and the electrical devices 140 that are being controlled by the electrical switch device 120.

Continuing with reference to FIG. 1, the exemplary electrical switch device 120 is configured to receive instructions from the user 150 as to an amount of power to be delivered to each electrical device 140 at a given point in time. More specifically, the controller 122 of the electrical switch device 120 receives an activation/deactivation signal (e.g., the user 150 turning on/off the dimmer switch 132), sends such signal to the dimmer determination device 104, receiving a dimmer level from the dimmer determination device 104, and delivering an amount of power to the electrical device 140 based on the dimmer level.

In certain exemplary embodiments, the dimmer determination engine 112 is communicably coupled to the controller 122. The dimmer determination engine 112 of the dimmer determination device 104 receives an activation/deactivation signal from the controller 122, determines the time that such signal is received, determines an amount of ambient light when such signal is received, stores such information in the storage repository 138, uses the stored information and an algorithm 148 to generate a dimmer level for an electrical device 140, stores the dimmer level for the electrical device 140 in the storage repository 138, and sends the dimmer signal to the controller 122, all in accordance with one or more exemplary embodiments. The dimmer determination engine 112 can also perform other functions, as described below.

In certain exemplary embodiments, the optional bypass switch 130 of the electrical switch device 120 is communicably coupled to the hardware processor 124 and/or a separate hardware processor of the controller 122. The bypass switch 130 is enabled when a particular setting on the bypass switch 130 is received. The bypass switch 130 has an enabled state (on) and a disabled state (off). The bypass switch 130, when in the enabled state, allows the dimmer determination engine 112 to communicate with the controller 122. When in the disabled state, the bypass switch 130 prevents the dimmer determination engine 112 from communicating with (e.g., sending a dimmer level) the controller 122.

As a specific example, the bypass switch 130, when enabled, allows the dimmer determination engine 112 to send a dimmer level signal to the controller 122, where the dimmer level is zero (i.e., the dimmer level is a signal for the controller to turn off the electrical device 140). As another specific example, the bypass switch 130, when enabled, prevents the dimmer determination engine 112 from sending a dimmer level to the controller 122. For instance, if the dimmer determination engine 112, based on the current time and ambient light level, the prior dimming events 142, and the appropriate algorithm 148, determines that the dimmer level should be 50% (rather than the current 20%) for an electrical device 140, the signal for the dimmer level (to increase the dimmer level) would not be sent by the dimmer determination engine 112 to the controller 122.

In certain exemplary embodiments, the bypass switch 130, when enabled, prevents the dimmer determination engine 112 from sending one or more types of dimmer levels to the controller. For example, when the bypass switch 130 is enabled, the dimmer determination engine 112 may only be prevented from sending a dimmer level of zero to the controller 122, while all other dimmer levels generated by the dimmer determination engine 112 continue to be sent to the controller 122. In addition, or in the alternative, the bypass switch 130 can affect the operation of one or more other components of the dimmer determination device 104, including but not limited to the hardware processor 124, the timer 136, and the sensor 116.

When the controller 122 controls more than one electrical device 140, the bypass switch 130 can also include one or more features that allow a user 150 to select which of the electrical devices 140 are controlled by the controller 122, using the dimmer levels generated by the dimmer determination engine 112, when the bypass switch 130 is in the enabled state. For example, the bypass switch 130 can have a number of two-pole dual in-line package (DIP) switches, where each DIP switch corresponds to one of the electrical devices 140. As another example, the user 150 can select certain electrical devices 140 on an application interface, which serves as a virtual bypass switch 130. In certain exemplary embodiments, instructions delivered by the user 150 to the controller 122 and/or the dimmer determination engine 112 when the bypass switch 130 is in the enabled state supersede instructions delivered by the hardware processor 124 and/or the dimmer determination engine 112 to the controller 122.

The exemplary bypass switch 130 can be any type of switch. For example, the bypass switch 130 can be a physical switch that is manually manipulated (e.g., enabled) by a user 150 at the housing 102. An example of a physical switch is a DIP switch. As another example, the bypass switch 130 can be a pushbutton that toggles between the enabled state and the disabled state each time that the pushbutton is depressed. In the case where the bypass switch 130 is a pushbutton, the pushbutton can toggle in one or more of a number of ways. For example, the pushbutton can be depressed past a certain point to lock the pushbutton in place in the enabled state, and subsequently pushed again later in time past the certain point to unlock from the enabled state to toggle to the disabled state. As another example, the pushbutton can be depressed past a certain point and held in that position for some period of time (e.g., three seconds) to change states from enabled to disabled or from disabled to enabled.

In certain exemplary embodiments, the bypass switch 130 can be combined with some other switch, pushbutton, or other feature on the outer surface of or inside of the housing 102. For example, if a sliding dimmer switch is disposed on the front surface of the housing 102, the slider can be depressed for four seconds to toggle the bypass switch 130 between the enabled state and the disabled state.

Alternatively, or in addition, the bypass switch 130 can be program instructions (e.g., software, firmware) that are hardcoded and/or adjustable. The program instructions can be adjustable automatically, manually, and/or based on the occurrence of certain conditions. Such program instructions can reside on and/or be executed by the hardware processor 124. The bypass switch 130 is typically located within the housing 102 or disposed on an outer surface (e.g., face plate) of the housing 102, but the bypass switch 130 can also be located remotely from the housing 102 and communicably coupled to the electrical switch device 120.

In certain exemplary embodiments, the dimmer switch 132 of the electrical switch device 120 is communicably coupled to the controller 122 and/or the dimmer determination engine 112. Specifically, the dimmer switch 132 can send a signal to the controller 122 and/or the dimmer determination engine 112 to turn the electrical device 140 on and/or off. The dimmer switch 132 is enabled (turned on) when a particular setting (e.g., on, off, a dimmer level) on the dimmer switch 132 is received from a user 150.

The dimmer switch 132 can be any type of switch having any of a number of settings. Examples of a dimmer switch 132 can include a bipolar switch having two settings (e.g., on and off), a multi-pole switch having more than three settings (e.g., high, low, medium, and off), and a sliding switch having a number of discrete or continuous settings (as with a dimmer).

The dimmer switch 132 can have more than one capability. For example, a single light switch can turn a light on/off, adjust the light using a dimmer, turn a ceiling fan on/off, and adjust a speed of the ceiling fan.

The dimmer switch 132 can override the bypass switch 130. For example, when the bypass switch 130 is in the enabled state and the dimmer switch 132 is in the off position, if the dimmer switch 132 is turned on, then the electrical device 140 is turned on at a certain dimmer level set by the user 150 using the dimmer switch 132. Such can be the case even if dimming events 142 and the algorithms 148 for the electrical device 140 dictate that the electrical device 140 should be dimmed at a different level than what was set by the user 150. As another example, when the bypass switch 130 is in the enabled state and the dimmer switch 132 is in the off position, dimming events 142 and the algorithms 148 dictate that the electrical device 140 should remain off. If the user 150 then turns on the dimmer switch 132, then the electrical device 140 is turned on.

In other words, in certain exemplary embodiments, changing a position of the dimmer switch 132 can toggle the bypass switch 130 from the enabled state to the disabled state. Alternatively, changing the setting of the dimmer switch 132 while the bypass switch 130 is in the enabled state can keep the bypass switch 130 in the enabled state, but allow the new setting of the dimmer switch 132 to determine the output to the electrical device 140 until the algorithm 148, for the subsequent time of day as determined by the timer 136 and the ambient light level as determined by the sensor 116, dictates that the hardware processor 124, using the dimmer determination engine 112, changes the state of the electrical device 140.

The exemplary dimmer switch 132 can be any type of switch. For example, the dimmer switch 132 can be a physical switch that is manually manipulated (e.g., enabled) by a user 150 at the housing 102. An example of a physical switch is a DIP switch. As another example, the dimmer switch 132 can be a pushbutton that toggles between on and off each time that the pushbutton is depressed. Alternatively, or in addition, the dimmer switch 132 can be program instructions (e.g., software, firmware) that are hardcoded and/or adjustable. The program instructions can be adjustable automatically, manually, and/or based on the occurrence of certain conditions. Such program instructions can reside on and/or be executed by the hardware processor 124. The dimmer switch 132 is typically disposed on an outer surface (e.g., face plate) of the housing 102, but the dimmer switch 132 can also be located remotely from the housing 102 and communicably coupled to the electrical switch device 120.

In one exemplary embodiment, the dimmer determination engine 112 of the dimmer determination device 104 is configured to send information (e.g., dimmer level, dimming event 142, off event 144, instructions, signals) to and/or retrieve information (e.g., time of day, ambient light level, data, interactions) from the controller 122, memory 126, the timer 136, the sensor 116, the storage repository 138, the hardware processor 124, the bypass switch 130, the security module 128, any other components of the electrical switch device 120, the power supply 110, the user 150, and/or the electrical devices 140. Specifically, in certain exemplary embodiments, the dimmer determination engine 112 is configured to receive an interaction (also called a signal), originated by the user 150, from the bypass switch 130, and/or the dimmer switch 132. The interaction received by the dimmer determination engine 112 from the bypass switch 130 and/or the dimmer switch 132 can be of any suitable form, including but not limited to a pressure pulse, an electrical signal, and a digital code.

The exemplary dimmer determination engine 112 can receive one or more of a number of signals. For example, the dimmer determination engine 112 can receive an activation signal from the controller 122. An activation signal designates that the dimmer switch 132 is being turned on and that a dimmer level needs to be generated by the dimmer determination engine 112. An activation signal is generally initiated by the user 150 (e.g., turning on the dimmer switch 132) and generated by the controller 122 for the dimmer determination engine 112.

Another example of a signal that can be received by the dimmer determination engine 112 is a termination signal (also called a deactivation signal). A deactivation signal designates that the dimmer switch 132 is being turned off and that a dimmer level needs to be set to zero. In some cases, the deactivation signal is generated by the dimmer determination engine 112 (as when the dimmer determination engine 112 determines, using an algorithm 148, that the electrical device should be turned off). At other times, a deactivation signal is initiated by the user 150 (e.g., turning off the dimmer switch 132) and generated by the controller 122 for the dimmer determination engine 112.

Yet another example of a signal that can be received by the dimmer determination engine 112 is an adjusted dimmer level signal. An adjusted dimmer level signal designates that the dimmer level is being changed. In some cases, the adjusted dimmer level signal is generated by the dimmer determination engine 112 (as when an algorithm 148 is modified by the dimmer determination engine 112, generating a different dimmer level for a certain time of day and a certain ambient light level). At other times, an adjusted dimmer level signal is initiated by the user 150 (e.g., adjusting the dimmer setting on the dimmer switch 132) and generated by the controller 122 for the dimmer determination engine 112.

In certain exemplary embodiments, the dimmer determination engine 112 is further configured to access, add to, and/or manipulate the off events 144, the dimming events 142, thresholds 158, and/or the algorithms 148 stored in the storage repository 138 for the one or more electrical devices 140. For example, when the dimmer determination engine 112 receives an activation signal (e.g., the dimmer switch 132 is turned on) from the dimmer switch 132 and/or the controller 122, the dimmer determination engine 112 records a dimming event 142 (including the time of day measured by the timer 136 and the ambient light level measured by the sensor 116) in the storage repository 138.

Subsequently, when the dimmer determination device 112 receives a signal, based on instructions stored in memory 126, the dimmer determination engine 112 receives and interprets the current time of day and the current ambient light level. The dimmer determination engine 112 then selects an appropriate algorithm 148 (based, in part, on the current time of day) and calculates, using one or more dimming events 142 stored in the storage repository 138, an appropriate dimmer level for an electrical device 140. The dimmer determination engine 112 also sends the calculated dimmer level to the controller 122, which uses the dimmer level to send a corresponding amount of power to the electrical device 140.

In addition, the dimmer determination engine 112 can compare one or more measurements (e.g., ambient light level, time) with a threshold 158 to determine whether the threshold 158 has been exceeded. In certain exemplary embodiments, the dimmer determination engine 112 is communicably coupled to the controller 122 using hard wires and/or using wireless technology. The dimmer determination engine 112 can be embodied in one or more of a number of forms, including but not limited to a microcontroller, a programmable logic controller, and a programmable gate array.

Examples of controlling an electrical device 140 by the controller 122 using the dimmer level generated by the dimmer determination engine 112 include, but are not limited to, sending voltage and/or current to turn on the electrical device 140, stopping voltage and/or current to turn off the electrical device 140, adjusting voltage and/or current to (as with a dimmer selection) to adjust an amount of output for the electrical device 140 (e.g., light fixture, ceiling fan), and flipping a switch to change a mode of operation (e.g., changing the direction of a ceiling fan) for the electrical device 140. In certain exemplary embodiments, the controller 122 controls each electrical device 140 using hard wires and/or using wireless technology. The controller 122 can be embodied in one or more of a number of forms, including but not limited to a microcontroller, a programmable logic controller, and a programmable gate array.

In exemplary embodiments, the one or more electrical devices 140 are any type of light fixture (e.g., a table lamp, a ceiling light, a wall light, a night light). An electrical device 140 can also include devices that can be integrated with a light, including but not limited to a ceiling fan (with or without an attached light). An electrical device 140 can also include other devices that control an electrical load. For example, an electrical device 140 can include a thermostat. Those skilled in the art will appreciate that an electrical device 140 can also be associated with other electrical devices (e.g., television, stereo, speakers) that can be controlled, directly or indirectly, by an electrical switch device 120. For example, exemplary embodiments can be used to control a downstream receptacle in which one or more electrical appliances are connected. Each electrical device 140 can be configured to communicate with the controller 122 using wired and/or wireless technology.

The user 150 interacts with the electrical switch device 120. Specifically, the user 150 sends commands to the electrical switch device 120 by, for example, moving a dimmer switch on the electrical switch device 120 from one position to a different position, turning a light switch on the electrical switch device 120 "on" or "off", and toggling the bypass switch 130 between the enabled state and the disabled state.

The user 150 is capable of interacting with the electrical switch device 120 using one or more of a number of touching instruments, including, but not limited to, a finger, a stylus, a cursor of a mouse, and a key on a keypad. The user 150 is capable of interacting with the electrical switch device 120 in person (e.g., physically touching the bypass switch 130 on or inside the housing 102 with a finger) or virtually (e.g., touching a portion of a graphical user interface (GUI) on an application of a computing device, which virtually changes a state of the bypass switch 130). The user 150 can be a homeowner, a business owner, a tenant, a landlord, an agent, an administrator, an energy manager, a consultant, a representative of the owner, or some other entity that manages one or more electrical devices 140 controlled by the electrical switch device 120.

In one or more exemplary embodiments, the user 150 uses a user system that operates using user software. The exemplary user system is, or can contain a form of, an Internet-based or an intranet-based computer system that is capable of communicating with the user software. A user system can include any type of computing device and/or communication device, including but not limited to the electrical switch device 120. Examples of the user system include, but are not limited to, a laptop computer with Internet or intranet access, a smart phone, a server, a server farm, and a personal digital assistant (PDA). In certain exemplary embodiments, the user system corresponds to a computer system as described below with regard to FIG. 4.

The user software can execute on the electrical switch device 120 and/or a separate device (e.g., a server, mainframe, desktop personal computer (PC), laptop, personal desktop assistant (PDA), television, cable box, satellite box, kiosk, telephone, mobile phone, or other computing devices) from the electrical switch device 120. In certain exemplary embodiments, the device on which the user software executes is coupled by a network (e.g., Internet, intranet, extranet, Local Area Network (LAN), Wide Area Network (WAN), or other network communication methods), with wired and/or wireless segments. The user software can also be part of, or operate separately from but in conjunction with, the electrical switch device 120.

The exemplary storage repository 138 is a persistent storage device (or set of devices) that stores software and data used to control one or more electrical devices 140. The storage repository 138 can store any type of suitable data associated with the electrical devices 140, including but not limited to times of day, ambient light levels, and formulas. Examples of a storage repository 138 include, but are not limited to, a database (or a number of databases), a file system, a hard drive, some other form of data storage, or any suitable combination thereof.

The storage repository 138 can be located on multiple physical machines, each storing all or a portion of the usage information, times of day, ambient light levels, formulas, and/or any other suitable information. Each storage unit or device can be physically located in the same or different geographic location, which can be within or outside of the housing 102 of the electrical switch device 120.

In certain exemplary embodiments, the storage repository 138 stores the dimming events 144 and off events 142 (collectively called "events") of an electrical device 140. The dimming events 144 and off events 142 track the usage of a particular electrical device 140 controlled by the controller 122 (using a dimmer level generated by the dimmer determination engine 112) and/or dimmer switch 132. A dimming event 142 is a record that captures, at least, an ambient light level (as measured by the sensor 116), a time of day (as measured by the timer 136), and a dimmer level (either as generated by the dimmer determination device 112 or as set by the user 150 on the dimmer switch 132) for each electrical device 140. An off event is a record that captures, at least, an ambient light level (as measured by the sensor 116) and a time of day (as measured by the timer 136) when the dimmer level as set to zero (either as generated by the dimmer determination device 112 or as set by the user 150 turning off the dimmer switch 132) for each electrical device 140.

The storage repository 138 can also store one or more algorithms 148, used by the hardware processor 124, which are used by the dimmer determination engine 112 to determine a dimmer level. Each algorithm 148 can be based on a recent number of records in the dimming events 142 and/or the off events 144 (e.g., a simple average of the ten most recent dimming events 142 for an electrical device 140), based on the time of day (e.g., determining a dimmer level for a signal (e.g., activation signal, adjusted dimmer level signal) received at 2:00 p.m. uses a different algorithm than the algorithm used for a signal received at 2:00 a.m.), based on the electrical device 140 for which the signal is associated, based one or more other factors, or any combination thereof. In certain exemplary embodiments, the hardware processor 124 generates and/or modifies an algorithm 148 based on adjusted dimmer level signals and/or other input received from the user 150. An algorithm 148 can also be used to establish and/or adjust a threshold 158.

The storage repository 138 can also store one or more thresholds 158, used by the hardware processor 124, which are used by the dimmer determination engine 112 to determine whether a dimmer level should be changed. Examples of such thresholds 158 can include, but are not limited to, a maximum run time threshold (the maximum continuous amount of time that an electrical device 140 should be on), a maximum ambient light level threshold (an amount of ambient light that is so high as to warrant turning off the electrical device 140), and a minimum change threshold (a minimum amount of change in the ambient light level). A threshold can be set by default, set and/or adjusted by a user 150, set and/or adjusted (for example, based on certain algorithms 148) by the dimmer determination engine 112 (using one or more algorithms 148), set and/or adjusted by some other suitable component, or any combination thereof.

The exemplary hardware processor 124 within the housing 102 of the electrical switch device 120 is configured to execute software in accordance with one or more exemplary embodiments. Specifically, the hardware processor 124 is configured to execute the instructions used to operate the electrical switch device 120, including any of its components, described above and shown in FIG. 1, as well as software used by the user 150 and/or the one or more electrical devices 140. The exemplary hardware processor 124 is an integrated circuit, a central processing unit, a multi-core processing chip, a multi-chip module including multiple multi-core processing chips, or other hardware processor. The hardware processor 124 can be known by other names, including but not limited to a computer processor, a microcontroller, a microprocessor, and a multi-core processor.

In one or more exemplary embodiments, the hardware processor 124 is configured to execute software instructions stored in memory 126. The exemplary memory 126 can include one or more cache memories, main memory, and/or any other suitable type of memory. In certain exemplary embodiments, the memory 126 is discretely located within the device 120 relative to the hardware processor 124. In certain configurations, the memory 126 can also be integrated with the hardware processor 124. The dimmer determination engine 112 and/or the hardware processor 124 can be integrated into one or more mixed signal integrated circuits. In such a case, the profile and/or cost of the dimmer determination engine 112 and/or hardware processor 124 can be reduced.

Optionally, in one or more exemplary embodiments, the security module 128 is configured to secure interactions between the electrical switch device 120 and the user 150 and/or the electrical devices 140. More specifically, the exemplary security module 128 is configured to authenticate communication from software based on security keys verifying the identity of the source of the communication. For example, user software can be associated with a security key enabling the user 150 to interact with the electrical switch device 120. Further, the security module 128 can be configured to restrict interactions, the interactive templates displayed on the GUI, electrical devices 140 that can be accessed and/or controlled, and/or transmission of information (e.g., operating status of a light or fan), as well as access to other information. For example, the user 150 can be restricted to only select an enabled state of the bypass switch 130 for only certain electrical devices 140 associated with and/or approved for that specific user 150.

The timer 136 is operatively coupled to the dimmer determination engine 112. The timer 136 can be located within the housing 102 of the electrical switch device 120. Alternatively, the timer 136 can be located remotely from the housing 102. The timer 136 can be a physical device, a circuit that includes one or more of a number of discrete components (e.g., resistor, capacitor), an integrated circuit, software (as executed by the hardware processor 124, for example), or any suitable combination thereof.

In exemplary embodiments, a timer 136 of the dimmer determination device 104 is configured to keep clock time and calendar time. The timer 136 can, in certain exemplary embodiments, track one or more periods of time (e.g., track a running operating time for an electrical device 140 at a particular dimmer level, track an amount of time that an electrical device 140 has been on). If so configured, the timer 136 is configured to track one or more times at a single time. The exemplary timer 136 can also be configured to communicate times, as well as receive instructions to start tracking a time period, from the dimmer determination engine 112. For example, the timer 136 is configured to notify the dimmer determination engine 112 of the time when the dimmer determination engine 112 sends a dimmer level to the controller 122 to turn on or off an electrical device 140. As another example, the timer 136 can be configured to measure a period of time from when the dimmer determination engine 112 sends a dimmer level to when the dimmer determination engine 112 sends a subsequent dimmer level. The timer 136 can track time in meridians (a.m., p.m.) and/or in military time.

The timer 136 can also track calendar time and geographic considerations. For example, the timer 136 can track the day, month, and year in addition to the specific time of day. As another example, the timer 136 can track and account for time zones and daylight savings time. The timer 136 can track such elements of time based on default settings, based on inputs from a user 150, based on relevant information received from a third party (e.g., when such information is downloaded from a manufacturer or obtained over the Internet), based on some other source, or any combination thereof. The timer 136 can perpetually track time, regardless of whether an electrical device 140 is on or off. Any time measured by the timer 136 can be sent as a signal to the dimmer determination engine 112.

The battery 114 of the dimmer determination device 104 can be used to provide power to one or more components of the dimmer determination device 104 when power from the power supply 110 ceases. For example, if power provided from the power supply 110 is cut off or otherwise interrupted, the battery 114 can provide power to the timer 136 until the power from the power supply 110 resumes. In such a case, the clock time kept by the timer 136 continues, using the battery 114, rather than being reset when the power from the power supply 110 resumes.

The battery 114 can provide any voltage (e.g., 3V, 9V, 12V) and/or current, and have any size suitable for providing power to the one or more components of the dimmer determination device 104 and/or being positioned within the housing 102. The battery 114 can be replaceable or non-replaceable. In certain exemplary embodiments, the battery 114 is rechargeable. For example, the battery 114 can be recharged (as with a trickle charge) by the power provided from the power supply 110 when the battery 114 is not needed or used.

In certain exemplary embodiments, the sensor 116 detects ambient light. Specifically, the sensor 116 measures the amount of ambient light that exists in a space at a point in time. A sensor 116 can be integrated with the housing 102 or remotely located from the housing 102. There can be multiple sensors 116 that are communicably coupled to a dimmer determination device 104. A space can be any area that in which an electrical device 140 is located. The space can be within a structure (e.g., building, office, garage) or outside of a structure.

Each exemplary sensor 116 can be communicably coupled to the dimmer determination engine 112. When the sensor 116 is integrated with the housing 102, the sensor 116 can be located within and/or on an outer surface of the housing 102 of the electrical switch device 120. The sensor 116 can be a physical device, a circuit that includes one or more of a number of discrete components (e.g., resistor, capacitor), an integrated circuit, software (as executed by the hardware processor 124, for example), or any suitable combination thereof. The sensor 116 can operate continuously (continuously measure the ambient light level and send measurements of the ambient light level to the dimmer determination engine 112), on a random basis, at the instruction of the dimmer determination engine 112, on the occurrence of an event (e.g., passage of time), based on some other components and/or factor, or any combination thereof.

The sensor 116 can be a separate (stand-alone) component of the dimmer determination device 104. Alternatively, the sensor 116 can be combined with some other component or device. For example, the sensor 116 can be positioned on a separate electrical switch device that is communicably coupled with the dimmer determination device 104. As another example, the sensor 116 can be integrated with the slider on a sliding dimmer switch 132 on the front surface of the housing 102 of the electrical switch device 120.

In certain exemplary embodiments, the sensor 116 uses one or more types of sensing technology to detect and measure the ambient light level. A sensor 116 can operate continuously, on a random basis, on a periodic basis, when called upon by the dimmer determination engine 112, or any suitable combination thereof. Regardless of the sensing technology used by a sensor 116, the sensor 116 can operate in a certain manner (e.g., send a signal describing the ambient light level to the dimmer determination engine 112, cease sending a signal describing the ambient light level to the dimmer determination engine 112) based on one or more conditions associated with ambient light levels. For example, the sensor 116 can send a signal to the dimmer determination engine 112 when the sensor 116 detects a change (e.g., within a threshold range) in the ambient light level. As another example, the sensor 116 sends a signal to the dimmer determination engine 112 when the sensor 116 receives a request from the dimmer determination engine 112 for the ambient light level.

The signals sent by the sensor 116 to the dimmer determination engine 112 can be in any format recognized by the dimmer determination engine 112. Further, the measurement of ambient light level made by the sensor 116 can be provided in one or more of a number of units. Examples of such units can include, but are not limited to, lumens, a percentage (with respect to, for example, a fixed number or a maximum target threshold of lumens for a given time of day), footcandles, candelas, and lux.

Figure 2A:
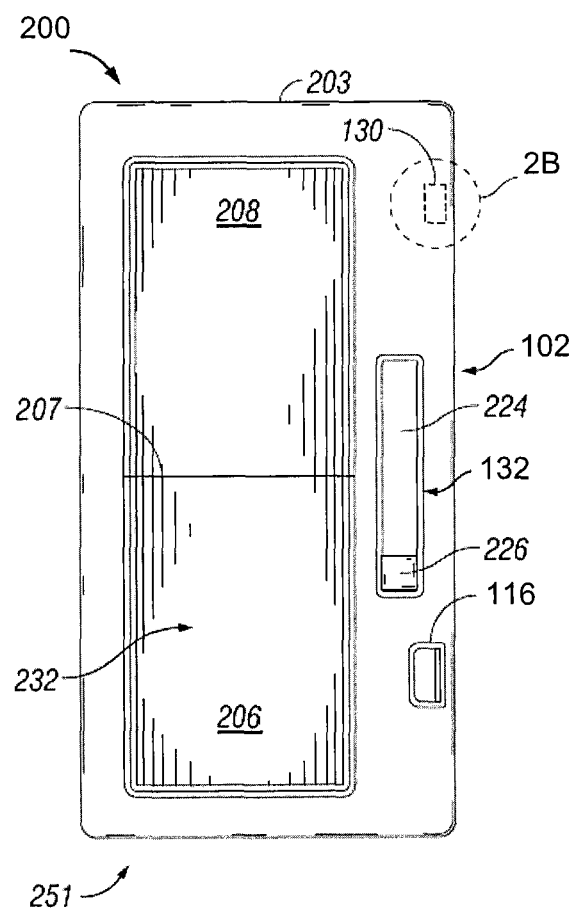
FIGS. 2A and 2B show various views of an exemplary electrical switch device with automatic dimming control in accordance with one or more exemplary embodiments.
Figure 2B:
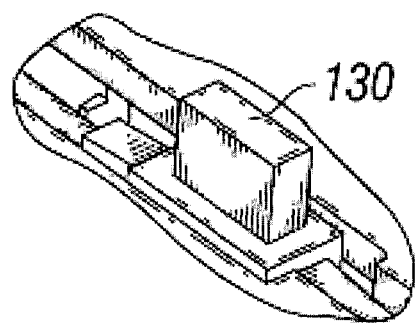

FIGS. 2A and 2B show various views of an exemplary electrical switch device 200 in accordance with one or more embodiments. Specifically, FIG. 2A shows a front view of an exemplary electrical switch device 200 having an on/off switch 232 and a dimmer switch 132 disposed on the outer surface of the housing 250. FIG. 2 shows a perspective view of an exemplary bypass switch 130 of the electrical switch device 200 of FIG. 2A.

Referring now to FIGS. 1, 2A, and 2B, the exemplary electrical switch device 200 includes a wall plate 203 having one larger aperture through which the on/off switch 232 traverses, a second smaller aperture through which the sliding dimmer switch 132 traverses, and a third smallest aperture through which the sensor 116 protrudes. In this example, the on/off switch 232 is a two-pole switch that toggles between settings by applying pressure on a protruding top end 208. In such a case, when the protruding top end 208 is depressed, the bottom end 206, which is hingedly coupled to the top end 208 around a horizontal axis 207, protrudes.

The dimmer switch 132 shown in FIG. 2A can be a sliding dimmer switch that has a number of non-discrete dimmer settings. To adjust the dimmer level on the dimmer switch 132, the user 150 moves the slide 226 along the channel 224. When the slide 226 is at the bottom of the channel 224, as shown in FIG. 2A, the dimmer setting is at the lowest dimmer level. When the slide 226 is at the top of the channel 224, the dimmer setting is at the highest dimmer level. When the user 150 positions the slide 226 at any other point along the channel 224, the dimmer setting is set proportionately to the distance (e.g., as a percentage) from the top end of the channel 224.

The wall plate 230 can couple to the housing 102 (hidden from view behind the wall plate 230) in one or more of a number of ways, including but not limited to an interlocking snap and a fastening device (e.g., a screw). In one or more exemplary embodiments, the dimensions of the wall plate 203 can be any suitable length, width, and/or height. For example, the dimensions of the wall plate 203 for a single gang outlet box can be approximately 4¼ inches high and 2¾ inches wide. The wall plate 203 can also be oversized relative to a single gang combination device.

The apertures in the wall plate 203 through which the on/off switch 232 and/or the dimmer switch 132 protrude can be any suitable size (e.g., width, height, thickness, shape) to allow a user 150 to interact with (e.g., provide manual adjustment access to) the settings of the on/off switch 232 and/or the dimmer switch 132. For example, the aperture in the wall plate 203 can be approximately the same size as the protruding portion of the on/off switch 232 to secure the on/off switch 232. In certain exemplary embodiments, the apertures in the wall plate 203 are at least as large as the top portion of the on/off switch 232 and the top portion of the dimmer switch 132, respectively.

The front panel of the wall plate 203 (the portions of the wall plate 203 between the aperture through which the on/off switch 232 protrudes and the outer edges of the wall plate 203) can be of sufficient height/width to secure (for example, by extending over a least a portion of) the on/off switch 232 to the rest of the housing 102 of the electrical switch device 200. The wall plate 203 can be made of one or more of a number of suitable materials, including but not limited to metal and plastic.

The wall plate 203 of FIG. 2A also includes an aperture through which a sensor 116 protrudes. The sensor 116 can detect a level of ambient light and/or other elements (e.g., motion). In addition, the bypass switch 130 (detail shown in FIG. 2B) is accessible by removing the wall plate 203 from the housing 102. In certain exemplary embodiments, when the wall plate 203, the sensor 116, and the on/off switch 232, and/or the dimmer switch 132 are removable, the assembly of the wall plate 203, the sensor 116, and the on/off switch 232, and/or the dimmer switch 132 is called a faceplate.

Figure 3A:
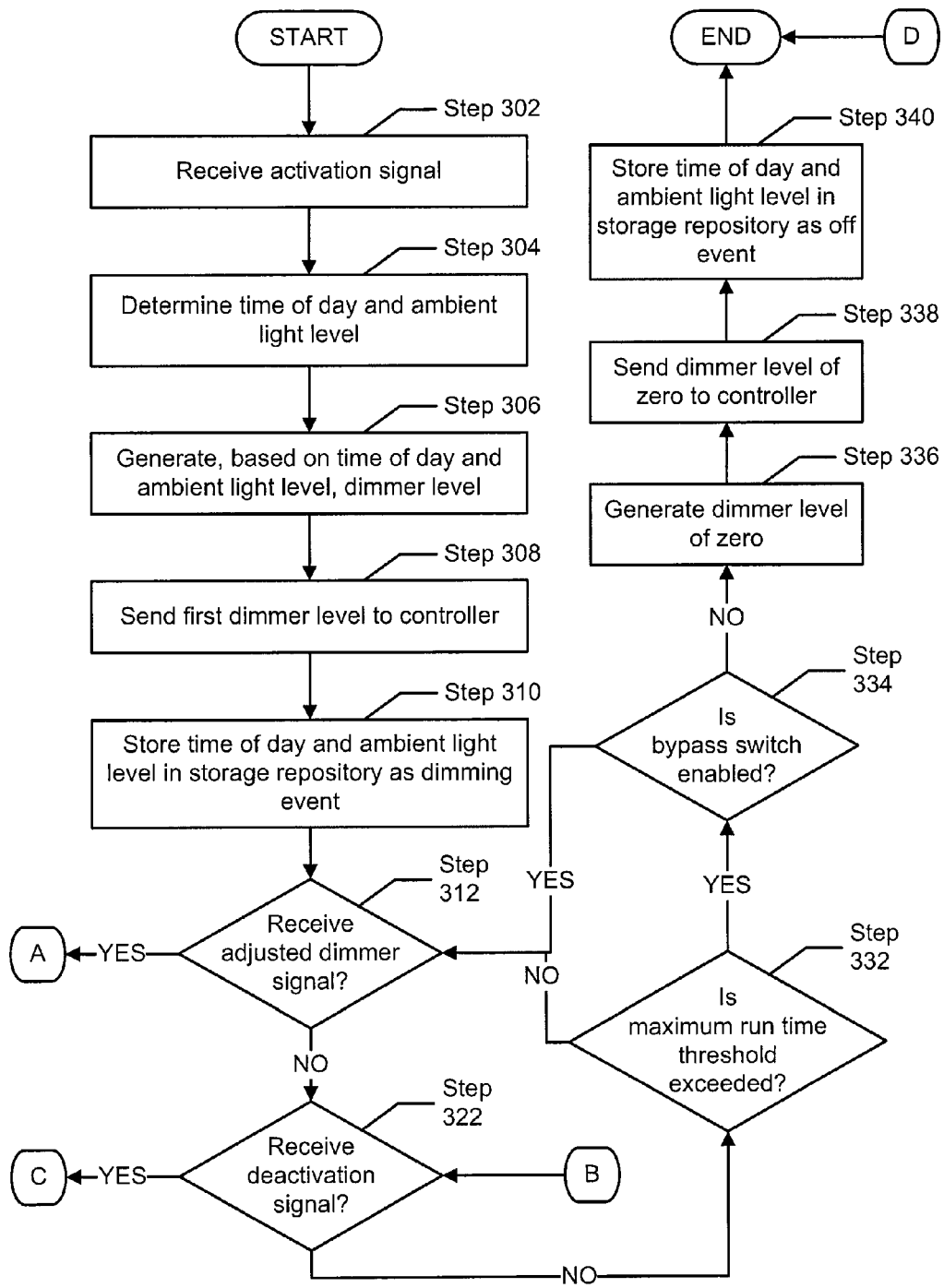
FIGS. 3A and 3B show a flowchart of an exemplary method for controlling an electrical device in accordance with one or more exemplary embodiments.
Figure 3B:
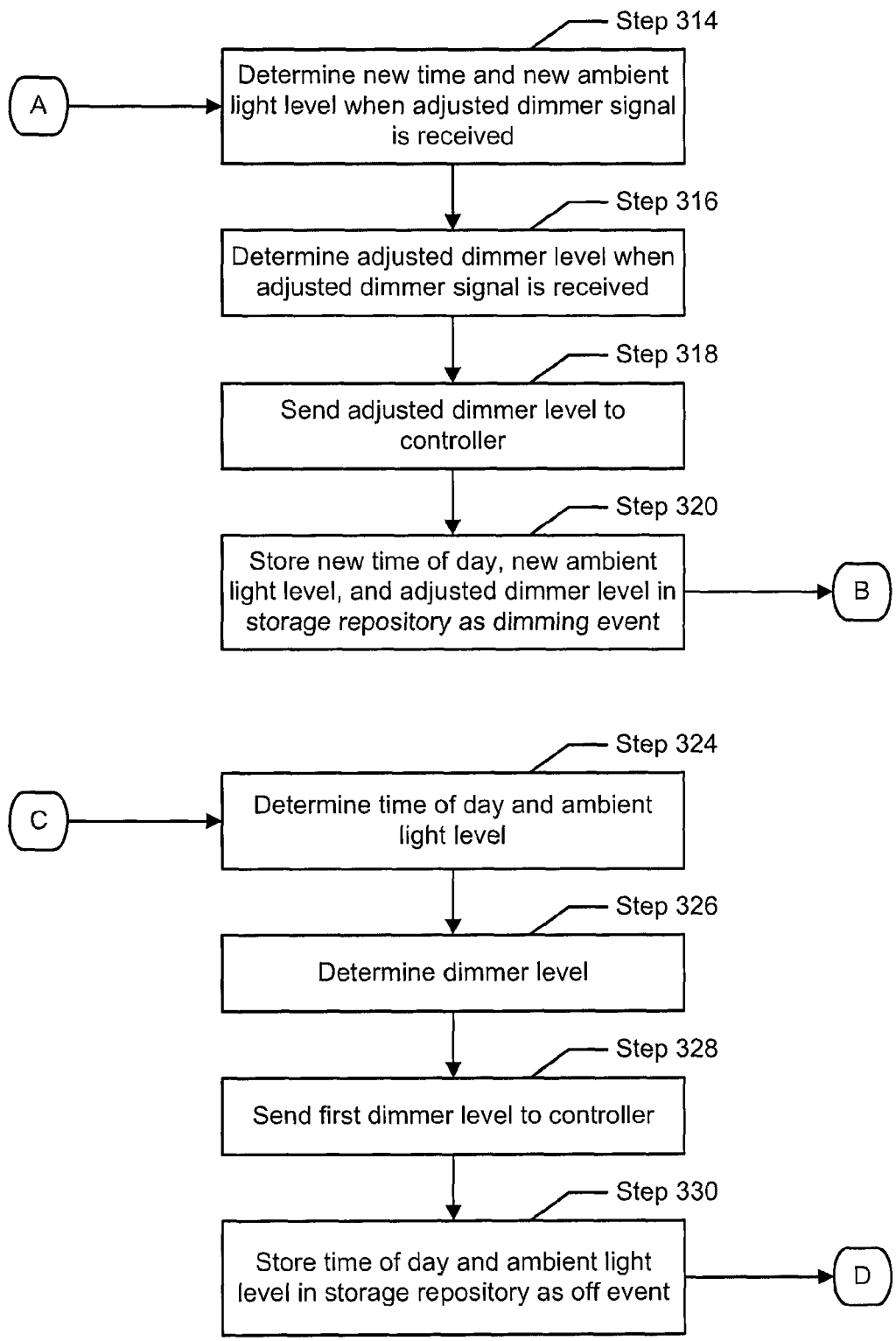

FIGS. 3A and 3B are a flowchart of a method 300 for determining a dimmer level for an electrical device with an exemplary electrical switch device in accordance with one or more exemplary embodiments. While the various steps in this flowchart are presented and described sequentially, one of ordinary skill will appreciate that some or all of the steps can be executed in different orders, can be combined or omitted, and some or all of the steps can be executed in parallel. Further, in one or more of the exemplary embodiments, one or more of the steps described below can be omitted, repeated, and/or performed in a different order.

In addition, a person of ordinary skill in the art will appreciate that additional steps, not shown in FIGS. 3A and 3B, can be included in performing this method. Accordingly, the specific arrangement of steps should not be construed as limiting the scope. In addition, a particular computing device, as described, for example, in FIG. 4 below, can be used to perform one or more of the steps for the method 300 described below.

Now referring to FIGS. 1-3B, the exemplary method 300 begins at the START step and proceeds to step 302, where an activation signal is received. In one or more exemplary embodiments, the activation signal is received by the dimmer determination engine 112 of the dimmer determination device 104. The activation signal can be received from the controller 122 of the electrical switch device 120. The activation signal can be initiated by a user 150 by turning on a dimmer switch 132. The activation signal is associated with an electrical device 140.

In step 304, the time of day and the ambient light level is determined. In exemplary embodiments, the time of day is measured by the timer 136, and the ambient light level is measured by the sensor 116. Once the time of day is measured by the timer 136, the timer 136 sends a signal to the dimmer determination engine 112 so that the dimmer determination engine 112 can determine, using the signal, the time of day. Likewise, once the ambient light level is measured by the sensor 116, the sensor 116 sends a signal to the dimmer determination engine 112 so that the dimmer determination engine 112 can determine, using the signal, the ambient light level. The time of day is measured at substantially the same time (with only a slight delay) as when the activation signal is received by the dimmer determination engine 112. The ambient light level is measured in a location approximately where the electrical device 140 is located.

In step 306, a dimmer level is generated. The dimmer level can be generated based on the time of day and the ambient light level. In certain exemplary embodiments, the dimmer level is generated by the dimmer determination engine 112. The dimmer determination engine 112 can use one or more algorithms 148 stored in the storage repository 138 to generate the dimmer level. The dimmer determination engine 112 can also use one or more dimming events 142 that have substantially similar times of day and/or ambient light levels compared to the time of day and ambient light level of the current instance. For example, the dimmer level can be generated by selecting a previous dimmer level that was used based on a previous time of day and a previous ambient light level, where the previous time of day is substantially close to the time of day and/or where the previous ambient light level is substantially close to the ambient light level.

The dimmer level can be generated using an algorithm 148 that uses the time of day and/or the ambient light level as inputs to the algorithm 148, where the algorithm 148 can use at least one formula. For a given electrical device 140, different algorithms 148 can be used based on the time of day and/or the ambient light level. For example, if the time of day is 4:00 a.m., the algorithm 148 for an electrical device 140 can be a simple average of the last five dimmer levels. On the other hand, if the time of day is 8:00 p.m., the algorithm 148 for the electrical device 140 can be a weighted average, where a 60% weight is given to the most recent dimmer level and a 40% average is given to the simple average of the ten dimmer levels immediately preceding the most recent dimmer level.

In step 308, the dimmer level is sent to the controller 122. In certain exemplary embodiments, the dimmer level is sent to the controller 122 by the dimmer determination engine 112. When the controller 122 receives the dimmer level, the controller 122 sends an amount of power to the electrical device 140, where the amount of power is based on the dimmer level. For example, if the electrical device 140 is a 10 W light source and if the dimmer level is 50%, the controller 122 sends 5 W of power to the electrical device 140.

In step 310, the time of day and the ambient light level are stored in the storage repository 138 as a dimming event 148. In certain exemplary embodiments, the dimming event 148 includes the dimmer level that was sent to the controller 122. The dimming events 148 can be organized in one or more of a number of ways in the storage repository 138. For example, a dimming event 148 can be organized by the dimmer level, by the time of day (which includes the date), by the ambient light level, by some other suitable factor, or by any combination thereof.

In step 312, a determination is made as to whether an adjusted dimmer signal is received. In certain exemplary embodiments, an adjusted dimmer signal corresponds to a new dimmer setting on the dimmer switch 132. The adjusted dimmer signal can be originated by one or more of a number of components, including but not limited to the user 150 and the sensor 116. In the case of a user 150 generating the adjusted dimmer signal, the user 150 selects the adjusted dimmer signal in response to the dimmer level generated by the dimmer determination device 112.

In other words, the adjusted dimmer signal corresponds to a change to the dimmer level for the electrical device 140. For example, if the amount of power delivered to the electrical device 140 by the controller 122 in response to the dimmer level is too low (e.g., when the electrical device 140 is a light source that is not bright enough for the user 150), the user 150 will increase the dimmer setting on the dimmer switch 132 to make the light source brighter. The dimmer setting set by the user 150 is the adjusted dimmer signal. The adjusted dimmer signal can be sent by the controller 132 and received by the dimmer determination engine 112.

In the case of the sensor 116 generating the adjusted dimmer signal, the sensor 116, either randomly, based on an instruction from the user 150, and/or based on the occurrence of some event (e.g., passage of time), measures the ambient light level and sends a signal of the new ambient light level to the dimmer determination device 112. When the signal for the new ambient light level is received from the sensor 116, the dimmer determination engine 112 determines the new ambient light level and compares it with the ambient light level determined in step 304 above (called an original ambient light level). If the difference between the new ambient light level and the original ambient light level exceeds a minimum change threshold (as stored as a threshold 158 in the storage repository 138), then the new ambient light level generates the adjusted dimmer signal. If the difference between the new ambient light level and the original ambient light level does not exceed a minimum change threshold, then no adjusted dimmer signal is generated.

Regardless of the source of the adjusted dimmer signal, the dimmer determination engine 112 determines whether the adjusted dimmer signal is received. If an adjusted dimmer signal is received, then the process proceeds to step 314. If an adjusted dimmer signal is not received, then the process proceeds to step 322.

In step 314, a new time and new ambient light level is determined when the adjusted dimmer signal is received. Depending on the delay between when the dimmer level is sent and when the adjusted dimmer signal is received, the new time and/or the new ambient light level can be substantially the same as the time and/or ambient light level of step 304. In exemplary embodiments, the new time of day is measured by the timer 136, and the new ambient light level is measured by the sensor 116.

Once the new time of day is measured by the timer 136, the timer 136 sends a signal to the dimmer determination engine 112 so that the dimmer determination engine 112 can determine, using the signal, the new time of day. Likewise, once the new ambient light level is measured by the sensor 116, the sensor 116 sends a signal to the dimmer determination engine 112 so that the dimmer determination engine 112 can determine, using the signal, the new ambient light level. If the adjusted dimmer signal originates from a change in ambient light level, then the new ambient light level is already received. The new time of day is measured at substantially the same time (with only a slight delay) as when the adjusted dimmer signal is received by the dimmer determination engine 112. The new ambient light level is measured in a location approximately where the electrical device 140 is located.

In step 316, an adjusted dimmer level is determined. The adjusted dimmer level can be generated based on the new time of day and/or the new ambient light level. In certain exemplary embodiments, the adjusted dimmer level is generated by the dimmer determination engine 112. If the adjusted dimmer signal is generated by the user 150 adjusting a dimmer setting on the dimmer switch 132, then the dimmer determination engine 112 can set the adjusted dimmer level directly from the adjusted dimmer signal, without using an algorithm 148. Alternatively, in such a case, the dimmer determination engine 112 can use an algorithm 148 stored in the storage repository 138 to determine the adjusted dimmer level.

If the adjusted dimmer signal is generated by the sensor 116, the dimmer determination engine 112 can use one or more algorithms 148 stored in the storage repository 138 to generate the dimmer level. The algorithm 148 used by the dimmer determination engine 112 can be the same or different algorithms 148 compared to those used in step 306 above. The dimmer determination engine 112 can also use one or more dimming events 142 that have substantially similar times of day and/or ambient light levels compared to the new time of day and new ambient light level of the current instance. The adjusted dimmer level can be generated using an algorithm 148 that uses the new time of day and/or the new ambient light level as inputs to the algorithm 148, where the algorithm 148 can use at least one formula. For a given electrical device 140, different algorithms 148 can be used based on the new time of day and/or the new ambient light level.

In step 318, the adjusted dimmer level is sent to the controller 122. In certain exemplary embodiments, the adjusted dimmer level is sent to the controller 122 by the dimmer determination engine 112. When the controller 122 receives the adjusted dimmer level, the controller 122 sends an amount of power to the electrical device 140, where the amount of power is based on the adjusted dimmer level.

In step 320, the new time of day, the new ambient light level, and the adjusted dimmer level is stored in the storage repository 138 as a dimming event 142. The new time of day, the new ambient light level, and the adjusted dimmer level can be stored by the dimmer determination engine 112. In certain exemplary embodiments, the dimming event 148 further includes the source of the adjusted dimmer signal and, if applicable, the difference between the new ambient light level and the original ambient light level.

In step 322, a determination is made as to whether a deactivation signal has been received. The deactivation signal is when the dimmer switch 132 is turned off. In certain exemplary embodiments, the dimmer determination engine 112 determines whether a deactivation signal has been received. The deactivation signal can be originated by a user 150 (e.g., manually enabling the off switch on the dimmer switch 132), by the dimmer determination engine 112 (e.g., if the sensor 116 measures the ambient light level, which is determined by the dimmer determination engine 112 to be so high as to exceed a maximum ambient light level threshold, stored as a threshold 158 in the storage repository 138), some other suitable component, or any combination thereof. If a deactivation signal has been received, the process proceeds to step 322. If a deactivation signal not has been received, the process proceeds to step 328.

In step 324, the time of day and the ambient light level when the deactivation signal is received is determined. The dimmer determination engine 112 can determine the time of day and the ambient light level. In certain exemplary embodiments, the time of day is measured by the timer 136, and the ambient light level is measured by the sensor 116. Once the time of day is measured by the timer 136, the timer 136 sends a signal to the dimmer determination engine 112 so that the dimmer determination engine 112 can determine, using the signal, the time of day. Likewise, once the ambient light level is measured by the sensor 116, the sensor 116 sends a signal to the dimmer determination engine 112 so that the dimmer determination engine 112 can determine, using the signal, the ambient light level. The time of day is measured at substantially the same time (with only a slight delay) as when the deactivation signal is received by the dimmer determination engine 112. The ambient light level is measured in a location approximately where the electrical device 140 is located.

In step 326, a dimmer level is determined. In this case, the dimmer level is set to zero. The dimmer level can be determined by the dimmer determination engine 112. In certain exemplary embodiments, the dimmer determination engine 112 does not use an algorithm 148 to determine the dimmer level.

In step 328, the dimmer level is sent to the controller 122. The dimmer level can be sent by the dimmer determination engine 112. In certain exemplary embodiments, the dimmer level is sent to the controller 122 by the dimmer determination engine 112. When the controller 122 receives the dimmer level, the controller 122 stops sending power to the electrical device 140 because the dimmer level is zero.

In step 330, the time of day and the ambient light level is stored as an off event 144 in the storage repository 138. The time of day and the ambient light level can be stored by the dimmer determination engine 112. In certain exemplary embodiments, the off event 144 further includes the source of the deactivation signal. After step 330 is complete, the process then continues to the END step.

In step 332, a determination is made as to whether a maximum run time threshold (stored as a threshold 158 in the storage repository 138) has been exceeded. In other words, a determination is made as to whether the electrical device 140 has been on for an excessive amount of time. In certain exemplary embodiments, the dimmer determination engine 112 determines whether the maximum run time threshold has been exceeded. The determination is based on a run time reading kept by the timer 136 and sent to the dimmer determination engine 112. The dimmer determination engine 112 then compares the run time reading received from the timer 136 and compares the run time reading with the maximum run time threshold. If the maximum run time threshold has been exceeded, then the process proceeds to step 334. If the maximum run time threshold has not been exceeded, then the process reverts to step 312.

In step 334, a determination is made as to whether the bypass switch 130 is enabled. In certain exemplary embodiments, the dimmer determination engine 112 determines whether the bypass switch 130 is enabled. If the bypass switch 130 is enabled, then the process reverts to step 312. If the bypass switch 130 is not enabled, then the process proceeds to step 336.

In step 336, a dimmer level of zero is generated. The dimmer level can be determined by the dimmer determination engine 112. In certain exemplary embodiments, the dimmer determination engine 112 does not use an algorithm 148 to determine the dimmer level. In step 338, the dimmer level of zero is sent to the controller 122. The dimmer level can be sent by the dimmer determination engine 112. In certain exemplary embodiments, the dimmer level is sent to the controller 122 by the dimmer determination engine 112. When the controller 122 receives the dimmer level, the controller 122 stops sending power to the electrical device 140 because the dimmer level is zero.

In step 340, the time of day and the ambient light level is stored as an off event 144 in the storage repository 138. The time of day and the ambient light level can be stored by the dimmer determination engine 112. In certain exemplary embodiments, the off event 144 further includes the run time of the electrical device 140. After step 340 is complete, the process then continues to the END step.

In one or more exemplary embodiments, the dimmer determination engine 112 uses the timer 136 to monitor an amount of time between when the dimmer determination engine 112 sends a dimmer level to the controller 122 and when the user 150 initiates a signal that is sent by the controller 122 to the dimmer determination engine 112. In such a case, the dimmer determination engine 112 can make adjustments to one or more algorithms 148 and/or one or more thresholds 158. For example, if the dimmer determination engine 112 sends a dimmer level of zero for an electrical device 140 to the controller 122 based on the maximum run time threshold of 2 hours (as measured by the timer 136) being exceeded, and if the user turns on the dimmer switch 132 for the electrical device 140 30 seconds thereafter, the dimmer determination engine 112 can increase the maximum run time threshold. The amount that the maximum run time threshold for the electrical device 140 is increased by the dimmer determination device 112 can depend on one or more of a number of factors, including but not limited to the time of day, the ambient light level, the electrical device 140, and the amount of time between sending the dimmer level and receiving a signal corresponding to an action initiated by the user 150.

Figure 4:
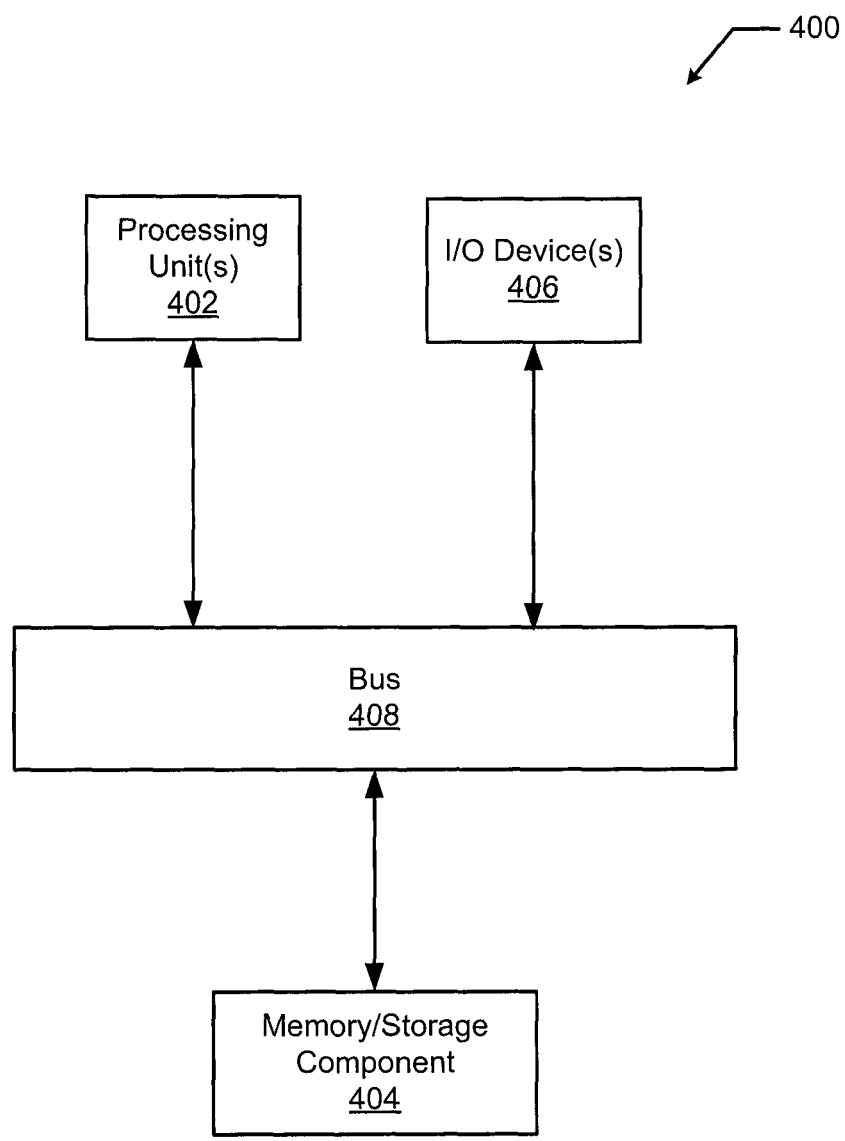
FIG. 4 shows a computer system in accordance with one or more exemplary embodiments.

FIG. 4 illustrates one embodiment of a computing device 400 capable of implementing one or more of the various techniques described herein, and which can be representative, in whole or in part, of the elements described herein. Computing device 400 is only one example of a computing device and is not intended to suggest any limitation as to scope of use or functionality of the computing device and/or its possible architectures. Neither should computing device 400 be interpreted as having any dependency or requirement relating to any one or combination of components illustrated in the example computing device 400.

Computing device 400 includes one or more processors or processing units 402, one or more memory/storage components 404, one or more input/output (I/O) devices 406, and a bus 408 that allows the various components and devices to communicate with one another. Bus 408 represents one or more of any of several types of bus structures, including a memory bus or memory controller, a peripheral bus, an accelerated graphics port, and a processor or local bus using any of a variety of bus architectures. Bus 408 can include wired and/or wireless buses.

Memory/storage component 404 represents one or more computer storage media. Memory/storage component 404 can include volatile media (such as random access memory (RAM)) and/or nonvolatile media (such as read only memory (ROM), flash memory, optical disks, magnetic disks, and so forth). Memory/storage component 404 can include fixed media (e.g., RAM, ROM, a fixed hard drive, etc.) as well as removable media (e.g., a Flash memory drive, a removable hard drive, an optical disk, and so forth).

One or more I/O devices 406 allow a customer, utility, or other user to enter commands and information to computing device 400, and also allow information to be presented to the customer, utility, or other user and/or other components or devices. Examples of input devices include, but are not limited to, a keyboard, a cursor control device (e.g., a mouse), a microphone, and a scanner. Examples of output devices include, but are not limited to, a display device (e.g., a monitor or projector), speakers, a printer, and a network card.

Various techniques can be described herein in the general context of software or program modules. Generally, software includes routines, programs, objects, components, data structures, and so forth that perform particular tasks or implement particular abstract data types. An implementation of these modules and techniques can be stored on or transmitted across some form of computer readable media. Computer readable media can be any available non-transitory medium or non-transitory media that can be accessed by a computing device. By way of example, and not limitation, computer readable media can comprise "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The computer device 400 can be connected to a network (not shown) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means can take other forms, now known or later developed. Generally speaking, the computer system 400 includes at least the minimal processing, input, and/or output means necessary to practice one or more embodiments.

Further, those skilled in the art will appreciate that one or more elements of the aforementioned computer device 400 can be located at a remote location and connected to the other elements over a network. Further, one or more exemplary embodiments can be implemented on a distributed system having a plurality of nodes, where each portion of the implementation (e.g., controller 122, dimmer determination engine 112) can be located on a different node within the distributed system. In one or more embodiments, the node corresponds to a computer system. Alternatively, the node can correspond to a processor with associated physical memory. The node can alternatively correspond to a processor with shared memory and/or resources.

The following description (in conjunction with FIGS. 1 through 4) describes an example in accordance with one or more exemplary embodiments. The example is for explanatory purposes only and is not intended to limit the scope. Terminology used in FIGS. 1-4 can be used in the example without further reference to those figures.

Example

Figure 5:
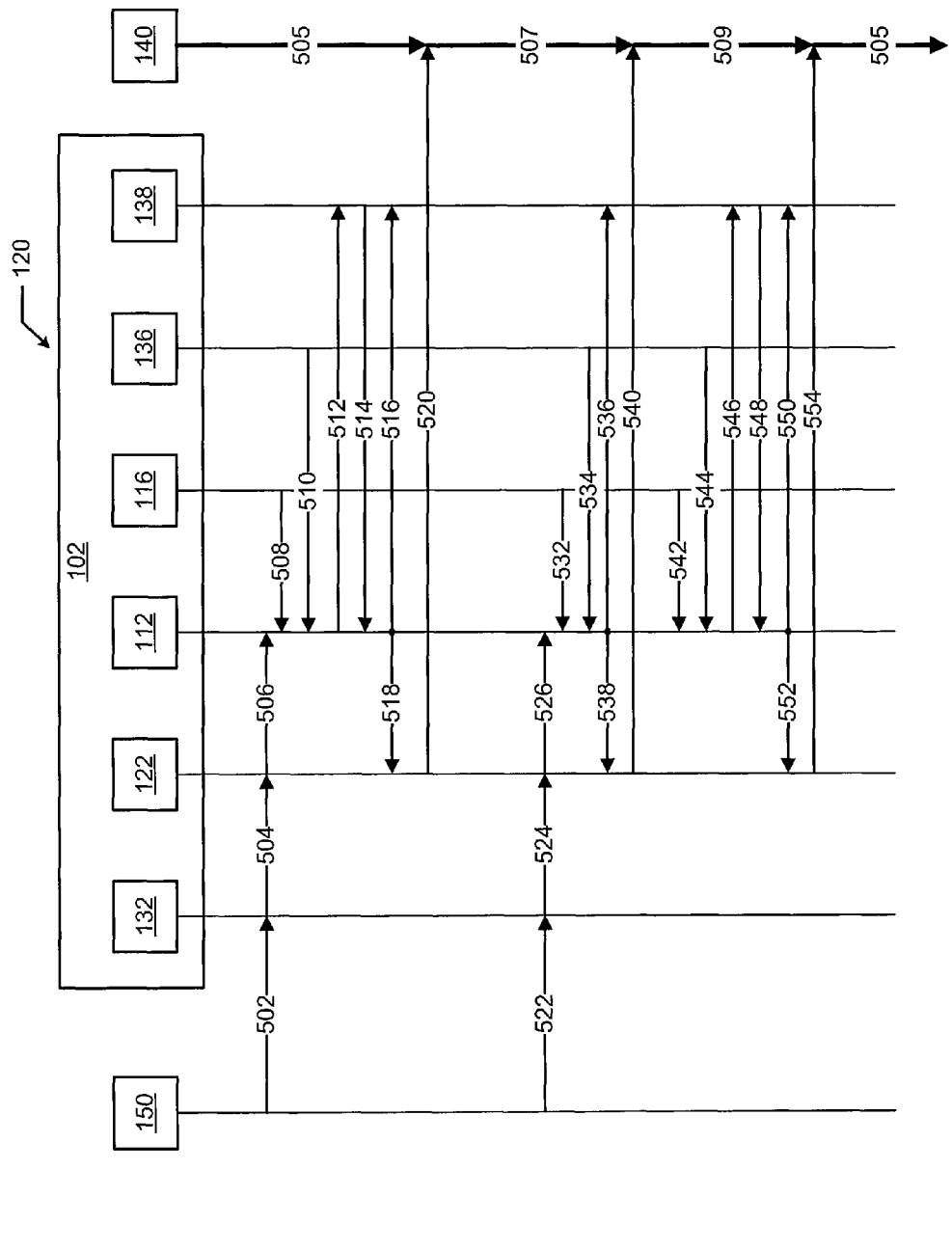
FIG. 5 shows an example using an exemplary electrical switch device with automatic dimming control in accordance with one or more exemplary embodiments.

Referring to FIGS. 1-5, consider the following example of a system 500 using an exemplary dimmer determination device 104 to determine a dimmer level for an electrical device 140, as described above. As shown in FIG. 5, a user 150 interacts with the dimmer switch 132 by turning on 502 the dimmer switch 132. At this time, the electrical device 140 (a light source in this example) corresponding to the dimmer switch 132 is off 505. Once the dimmer switch 132 is turned on 502, the dimmer switch 132 sends a signal 504 to the controller 122 of the electrical switch device 120 to turn on the electrical device 140. When the controller 122 receives the signal 504 from the dimmer switch 132, the controller 122 sends an activation signal 506 to the dimmer determination engine 112.

Shortly (e.g., within a few cycles) of receiving the activation signal 506 from the controller 122, the dimmer determination engine 112 receives a signal 508 representing the ambient light level from the sensor 116 and a signal 510 representing the time of day from the timer 136. The signals 508, 510 received by the dimmer determination engine 112 can be initiated based on one or more of a number of factors and/or events. For example, the dimmer determination engine 112 can receive the signal 508 representing the ambient light level from the sensor 116 and the signal 510 representing the time of day from the timer 136 based on a specific request, generated in response to receiving the activation signal 506 from the controller 122, sent to the sensor 116 and the timer 136. Alternatively, the sensor 116 and/or the timer 136 can continually or on a periodic (e.g., every second) basis send the signals 508, 510 to the dimmer determination engine 112.

The dimmer determination engine 112 then determines the time of day based on the signal 510 representing the time of day and the ambient light level based on the signal 508 representing the ambient light level. In this example, the time of day is 8:18 p.m. on Thursday, Aug. 9, 2012, and the ambient light level is 200 lumens.

Once the dimmer determination engine 112 receives the activation signal 506 and the has determined the time of day and the ambient light level, the dimmer determination engine 112 selects the proper algorithm 148 for determining the dimmer level. The dimmer determination engine 112 sends a signal 512 to the storage repository 138 to retrieve the proper algorithm 148. To select the proper algorithm 148, several filters must be traversed. Initially, the proper categories must be selected for the time of day. An initial category is for the month of the year, and so the option for August is selected. Next, a category exists for the day of the week, and so the option for Thursday is selected. From there, a time of day category is selected. The following tables list the various time of day category options for this particular electrical device 140:

| OPTION 1 | OPTION 2 | OPTION 3 | OPTION 4 | OPTION 5 | OPTION 6 | OPTION 7 |
|---|---|---|---|---|---|---|
| 12 a.m.-4:30 a.m. | 4:31 a.m.-5:30 a.m. | 5:31 a.m.-7:30 a.m. | 7:31 a.m.-7:00 p.m. | 7:01 p.m.-10:00 p.m. | 10:01 p.m.-11:00 p.m. | 11:01 p.m.-11:59 p.m. |

Option 5 is selected from the table above based on the time of day. Then, an appropriate algorithm 148 is selected based on the ambient light level of 200 lumens. The table below shows the various algorithm category options.

| Range of Lumens | Algorithm |
|---|---|
| 0-250 | $0.5 \times D_1 + 0.3 \times D_2 + 0.2 \times D_3$ |
| 251-550 | $0.4 \times D_1 + 0.35 \times D_2 + 0.25 \times D_3$ |
| 551-800 | $0.7 \times D_1 + 0.2 \times D_2 + 0.1 \times D_3$ |
| 801- | $0.6 \times D_1 + 0.3 \times D_2 + 0.1 \times D_3$ |

In the table above, the constants (e.g., 0.5, 0.3) are weighting factors, $D_1$ is the most recent dimmer level when the ambient light level is within the range of lumens, $D_2$ is the second most recent dimmer level when the ambient light level is within the range of lumens, and $D_3$ is the third most recent dimmer level when the ambient light level is within the range of lumens. Based on the ambient light level in this example, the algorithm to use is $0.5 \times D_1 + 0.3 \times D_2 + 0.2 \times D_3$.

Over time and with additional input from the user 150, the dimmer determination engine 112 can adjust the constants, as well as the number of previous dimmer levels. In addition, the dimmer determination engine 112 can alter the range of lumens and/or add/delete categories of ranges of lumens. For example, while the table above shows algorithms for 4 ranges of lumens, the dimmer determination engine 112 can change the ranges of lumens and add a fifth algorithm. If there are not enough historical dimmer levels for a given time of day and ambient light level, then a default value (as set, for example, by the manufacturer or the user 150) can be used until enough dimmer levels have been recorded in the storage device 138.

The historical dimming levels are also stored in the storage repository 138 as part of dimming events 142. The dimmer determination engine 112 retrieves these historical dimmer levels as $D_1=75\%$, $D_2=65\%$, and $D_3=68\%$. With this information, the dimmer determination engine 112 uses the historical dimmer levels in the algorithm to determine that the dimmer level in this case is 70.6%. The dimmer determination engine 112 then sends a record 516 of the dimming event 142, which includes the time of day, the ambient light level, and the dimmer level, for storage in the storage repository 138.

In addition, the dimmer determination engine 112 sends a signal 518 representing the dimmer level of 70.6% to the controller 122. With the signal 518 representing the dimmer level of 70.6%, the controller 122 sends an amount of power 520 approximately equal to 70.6% of full power to the electrical device 140. As a result, the electrical device 140 goes from being off 505 to being turned on and illuminating 507 at approximately 70.6% of full output.

Continuing with FIG. 5, after some period of time (e.g., a few seconds, a few hours), the user 150 determines that the output of the electrical device 140 needs to be adjusted and so changes the dimmer setting 522 on the dimmer switch 132. In this case, the user 150 adjusts the dimmer setting 522 of the dimmer switch 132 about five seconds after the electrical device 140 is turned on and the amount of power 520 approximately equal to 70.6% of full power is delivered by the controller 122 to the electrical device 140. Specifically, the user 150 moves the dimmer setting 522 on the dimmer switch 132 to approximately 80% of full output.

When the dimmer switch 132 receives the adjusted dimmer setting 522, the dimmer switch 132 sends a signal 524 to the controller 122 to adjust (in this case, increase) the amount of power delivered to the electrical device 140. When the controller 122 receives the signal 524 from the dimmer switch 132, the controller 122 sends an adjusted dimmer signal 526 to the dimmer determination engine 112.

Shortly (e.g., within a few cycles) of receiving the adjusted dimmer signal 526 from the controller 122, the dimmer determination engine 112 receives a signal 532 representing the ambient light level from the sensor 116 and a signal 534 representing the time of day from the timer 136. The dimmer determination engine 112 then determines the time of day based on the signal 534 representing the time of day and the ambient light level based on the signal 532 representing the ambient light level. In this example, the time of day is still 8:18 p.m. on Thursday, Aug. 9, 2012, and the ambient light level is still 200 lumens.

With this information received by the dimmer determination device 112, a few events occur. First, the dimmer determination device 112 sends a signal 538 representing the dimmer level of 80% to the controller 122. With the signal 538 representing the dimmer level of 80%, the controller 122 sends an amount of power 540 approximately equal to 80% of full power to the electrical device 140. As a result, the electrical device 140 goes from being illuminated 507 at approximately 70.6% of full output to being illuminated 509 at approximately 80% of full output. Although not shown in this example, the dimmer determination engine 112 can use an algorithm 148 stored in the storage repository 138 to generate the signal 538 sent to the controller 122.

Second, the dimmer determination engine 112 sends a record 536 of the dimming event 142, which includes the time of day, the ambient light level, the source (here, the user adjusting the dimmer setting 522 on the dimmer switch 132) of the adjusted dimmer signal 524, and the dimmer level, for storage in the storage repository 138. Using the information in the record 536 of the dimming event 142, the dimmer determination engine 112 can modify, add, and/or delete one or more algorithms 148 and/or one or more thresholds 158.

Continuing with FIG. 5, after some further period of time, the electronic device 140 continues to be illuminated 509 at 80% of full output. In this example, the period of time if approximately five hours. At this point, the dimmer determination engine 112 receives a signal 542 representing the ambient light level from the sensor 116 and a signal 544 representing the time of day from the timer 136. The dimmer determination engine 112 then determines the time of day based on the signal 544 representing the time of day and the ambient light level based on the signal 542 representing the ambient light level. In this example, the time of day is 1:18 p.m. on Wednesday, Aug. 10, 2012, and the ambient light level is zero lumens.

In receiving the signal 544 representing the time of day, the dimmer determination engine 112 calculates that the electronic device 140 has been on continuously for five hours. The dimmer determination engine 112 sends a request 546 to storage repository 138 to retrieve a maximum run time threshold from the thresholds 158 stored in the storage repository 138. In response, the storage repository 138 sends a response 548 to the dimmer determination engine 112, where the response includes the maximum run time threshold for the electronic device 140. In certain exemplary embodiments, there can be multiple maximum run time thresholds for the electronic device 140, where each of the maximum run time thresholds varies based on one or more of a number of factors, including but not limited to the time of day (e.g., month of year, day of week, clock time of day), the particular electrical device 140, the ambient light level, and time since most recent user input with the dimmer switch 132 and/or the controller 122.

In this example, the response 548 sent by the storage repository 138 tells the dimmer determination engine 112 that the maximum run time threshold is 5 hours. Thus, the dimmer determination engine 112 determines that the maximum run time threshold has been exceeded. The dimmer determination engine 112 then determines the state of the bypass switch 130 (not shown). In this example, bypass switch 130 is disabled, which means that the dimmer determination engine 112 can turn off an electronic device 140 whose continuous time on exceeds the maximum run time threshold.

Consequently, with this information received by the dimmer determination device 112, a few events occur. First, the dimmer determination device 112 sends a signal 552 representing the dimmer level of zero (also called an end dimmer level) to the controller 122. With the signal 552 representing the dimmer level of zero, the controller 122 stops sending power (no power 554) to the electrical device 140. As a result, the electrical device 140 goes from being illuminated 509 at approximately 80% of full output to being turned off 505.

Second, the dimmer determination engine 112 sends a record 550 of the off event 144, which includes the time of day, the ambient light level, the source (here, exceeding the maximum run time threshold) of the adjusted dimmer signal 524, the continuous run time of the electrical device 140, and the dimmer level, for storage in the storage repository 138. Using the information in the record 550 of the off event 144, the dimmer determination engine 112 can modify, add, and/or delete one or more algorithms 148 and/or one or more thresholds 158.

Exemplary embodiments described herein are directed to an electrical switch device with automatic dimming control. Using exemplary embodiments, a wide array of functionality (e.g., controlling, monitoring) with regard to one or more electrical devices is achieved in a space. Exemplary embodiments automatically determine a dimmer level of an electronic device by making adjustments to the software installed within such devices based on input received from a user.

In one or more exemplary embodiments, multiple electrical devices (e.g., lighting fixture, ceiling fan) can be controlled using a single exemplary electrical switch device. The use of a simple bypass switch increases the ease for the user to enable and disable some or all of the functionality of the exemplary electrical switch device.

Because of the ease with which a dimming level of one or more lighting devices is automatically determined, the user expends less energy in manually adjusting the dimmer setting of a dimmer switch. In addition, if a user forgets to turn off an electrical device, exemplary embodiments automatically turn off the electrical device when the electrical device has been left on continuously for a period of time.

Although embodiments described herein are made with reference to exemplary embodiments, it should be appreciated by those skilled in the art that various modifications are well within the scope and spirit of this disclosure. Those skilled in the art will appreciate that the exemplary embodiments described herein are not limited to any specifically discussed application and that the embodiments described herein are illustrative and not restrictive. From the description of the exemplary embodiments, equivalents of the elements shown therein will suggest themselves to those skilled in the art, and ways of constructing other embodiments using the present disclosure will suggest themselves to practitioners of the art. Therefore, the scope of the present invention is not limited herein.

I claim:

1. A method for determining a dimmer level for an electrical device, comprising:
   receiving, by a dimmer determination engine, an activation signal, wherein the activation signal is initiated by a user turning on a dimmer switch for the electrical device;
   determining, by the dimmer determination engine and in response to receiving the activation signal, a time of day and an ambient light level;
   generating, in response to receiving the activation signal and based on the time of day and the ambient light level, by the dimmer determination engine using a hardware processor, a first dimmer level; and
   sending, by the dimmer determination engine to a controller, the first dimmer level,
   wherein the controller sends an amount of power to the electrical device based on the first dimmer level.

2. The method of claim 1, wherein the first dimmer level is generated by selecting a previous dimmer level that was used based on a previous time of day and a previous ambient light level, wherein the previous time of day is substantially close to the time of day, and wherein the previous ambient light level is substantially close to the ambient light level.

3. The method of claim 1, wherein the first dimmer level is generated using an algorithm that uses the time of day and the ambient light level as inputs to the algorithm.

4. The method of claim 3, wherein the algorithm comprises a first formula to calculate the first dimmer level for a first time of day and a second formula to calculate a second dimmer level for a second time of day.

5. The method of claim 1, further comprising:
   storing the time of day and the ambient light level in the storage repository as a dimming event among a plurality of dimming events.

6. The method of claim 1, further comprising:
   receiving, in response to the first dimmer level, an adjusted dimmer signal;
   recording a new time that the adjusted dimmer signal is received;
   recording a new ambient light level when the adjusted dimmer signal is received;
   determining an adjusted dimmer level based on the adjusted dimmer signal; and
   storing the adjusted dimmer level, the new time, and the new ambient light level as a dimming event among a plurality of dimming events.

7. The method of claim 6, wherein the adjusted dimmer signal is originated by the user adjusting a setting on the dimmer switch.

8. The method of claim 6, wherein the adjusted dimmer signal is originated by a sensor, wherein the sensor measures the new light level that, when compared with the ambient light level, creates a difference, wherein the difference exceeds a minimum change threshold.

9. The method of claim 1, further comprising:
receiving a deactivation signal;
determining, in response to receiving the deactivation signal, an end time of day and an end ambient light level;
determining that bypass switch is disabled;
sending, to the controller, a second dimmer level; and
storing the end time of day and the end ambient light level as an off event of a plurality of off events,
wherein the second dimmer level is zero, and
wherein the controller terminates the power to the electrical device based on the second dimmer level.

10. The method of claim 9, further comprising:
receiving a subsequent activation signal;
determining, in response to receiving the subsequent activation signal, a subsequent time of day and a subsequent ambient light level; and
generating, based on the plurality of dimming events, the subsequent time of day, and the subsequent ambient light level, a subsequent dimmer level.

11. The method of claim 1, further comprising:
determining, after sending the first dimmer level and using the timer, that an run time threshold has been exceeded; and
sending, to a controller, a second dimmer level,
wherein the second dimmer level is zero, and
wherein the controller terminates the power to the electrical device based on the end dimmer level.

12. A dimmer determination device, comprising:
a storage repository that stores a plurality of events;
memory positioned within the cavity, wherein the memory stores a plurality of instructions;
an ambient light sensor;
a timer that tracks time;
a hardware processor for executing the plurality of instructions stored in the memory; and
a dimmer determination engine operatively coupled to the hardware processor, the storage repository, the memory, the ambient light sensor, and the timer, wherein the dimmer determination engine sends a plurality of dimming signals, generated using the plurality of events, to a dimming controller.

13. The dimmer determination device of claim 12, further comprising a bypass switch operatively coupled to the dimmer determination engine, wherein the bypass switch comprises an enabled state and a disabled state, wherein the enabled state prevents the dimmer determination engine from sending a signal.

14. The dimmer determination device of claim 12, wherein the plurality of events comprises a plurality of dimming events, wherein the plurality of dimming events comprises a plurality of ambient light levels and a plurality of times of day associated with a plurality of activation signals, as well as a plurality of new levels of ambient light and a plurality of new times of day associated with a plurality of adjusted dimmer levels.

15. An electrical switch device, comprising:
a housing having a plurality of walls forming a cavity;
a dimmer switch disposed on one of the plurality of walls and operatively coupled to an electrical device;
a controller operatively coupled to the dimmer switch and positioned inside the cavity; and
a dimmer determination device operatively coupled to the controller and positioned inside the cavity, wherein the dimmer determination device comprises:
a storage repository that stores a plurality of events;
memory positioned within the cavity, wherein the memory stores a plurality of instructions;
an ambient light sensor;
a timer that tracks time;
a hardware processor for executing the plurality of instructions stored in the memory; and
a dimmer determination engine operatively coupled to the hardware processor, the storage repository, the memory, the ambient light sensor, and the timer, wherein the dimmer determination engine sends a plurality of dimming signals, generated using the plurality of events, to the controller,
wherein the controller uses the plurality of dimming signals to determine an amount of power to send to the electrical device.

16. The electrical switch device of claim 15, wherein the plurality of events comprises a plurality of dimming events and a plurality of off events, wherein the plurality of dimming events comprises a plurality of levels of ambient light and a plurality of times of day associated with a plurality of activation signals, and wherein the plurality of off events comprises the plurality of levels of ambient light and a plurality of times of day associated with a plurality of deactivation signals.

17. The electrical switch device of claim 15, further comprising a battery that supplies power to a remainder of the components of the dimmer determination device when power from an external power source is terminated.

18. The electrical switch device of claim 15, wherein the dimmer switch is among a plurality of dimmer switches that receive, from the controller, a plurality of dimming signals generated by the dimmer determination engine.

19. The electrical switch device of claim 15, wherein the storage repository further stores a plurality of new ambient light levels, and a plurality of new times associated with a plurality of adjusted dimmer levels.

20. A non-transitory computer readable medium comprising computer readable program code embodied therein for performing a method for controlling an electrical device, the method comprising:
receiving, by a dimmer determination engine, an activation signal, wherein the activation signal is initiated by a user turning on a dimmer switch for the electrical device;
determining, by the dimmer determination engine and in response to receiving the activation signal, a time of day and an ambient light level;
generating, in response to receiving the activation signal and based on the time of day and the ambient light level, a dimmer level by the dimmer determination engine; and
sending, by the dimmer determination engine to a control device, the dimmer level,
wherein the control device sends an amount of power to the electrical device based on the dimmer level.

* * * * *